United States Patent
Munter et al.

(10) Patent No.: US 7,904,893 B2
(45) Date of Patent: Mar. 8, 2011

(54) POWER AND/OR ENERGY OPTIMIZED COMPILE/EXECUTION

(75) Inventors: Joel D. Munter, Chandler, AZ (US); Murthi Nanja, Portland, OR (US); Jin J. Xu, Beijing (CN); Zhiguo Gao, Beijing (CN)

(73) Assignee: Marvell International Ltd., Hamilton (BM)

( * ) Notice: Subject to any disclaimer, the term of this patent is extended or adjusted under 35 U.S.C. 154(b) by 1939 days.

(21) Appl. No.: 10/802,586

(22) Filed: Mar. 17, 2004

(65) Prior Publication Data

US 2005/0229149 A1 Oct. 13, 2005

(51) Int. Cl.
*G06F 9/45* (2006.01)
(52) U.S. Cl. .......... 717/148; 717/145; 717/158
(58) Field of Classification Search .......... None
See application file for complete search history.

(56) References Cited

U.S. PATENT DOCUMENTS

| | | | |
|---|---|---|---|
| 5,566,364 A | 10/1996 | Mizoguchi et al. | |
| 5,682,417 A | 10/1997 | Nitta | |
| 7,111,177 B1 * | 9/2006 | Chauvel et al. | 713/300 |
| 7,146,613 B2 * | 12/2006 | Chauvel et al. | 718/1 |
| 2002/0112227 A1 * | 8/2002 | Kramskoy et al. | 717/148 |
| 2003/0014742 A1 * | 1/2003 | Seth et al. | 717/158 |
| 2003/0079213 A1 * | 4/2003 | Cabillic et al. | 717/158 |
| 2004/0010785 A1 * | 1/2004 | Chauvel et al. | 717/158 |
| 2004/0015914 A1 * | 1/2004 | Renouf | 717/148 |
| 2005/0114850 A1 * | 5/2005 | Chheda et al. | 717/151 |

OTHER PUBLICATIONS

Chen et al., "Energy-Aware Compilation and Execution in Java-Enabled Mobile Devices", 2003 IEEE, pp. 1-8.*

* cited by examiner

*Primary Examiner* — Tuan Q Dam
*Assistant Examiner* — Ben C Wang

(57) ABSTRACT

A compiler with power and/or energy optimization, a complementary runtime manager, and system having the compiler and/or the runtime manager are described herein.

28 Claims, 4 Drawing Sheets

POWER AND/OR ENERGY OPTIMIZED COMPILE/EXECUTION

FIELD OF THE INVENTION

The present invention relates generally to the fields of data processing and data communication.

BACKGROUND OF THE INVENTION

Programming language compilers often include optimizers to improve the execution performance of the generated object code (also referred to as executable code or executables). The optimizations performed may include, for examples, removal of not executed codes ("dead code") to reduce the overall code size, loop unrolling for parallel execution to improve execution speed, and so forth.

In recent years, advances in microprocessor and related technologies have led to the development and availability of a wide range of wireless mobile devices, such as wireless mobile phones, personal digital assistants, and so forth. Concurrently, various software technologies, such as just-in-time compilation, and so forth, have been developed to facilitate cross platform application development.

The current state of just-in-time compilation has at least two disadvantages. First of all, it does not optimize for power level nor energy requirement of the wireless mobile devices. Secondly, the unconditional compilation of all received codes may be power and/or energy inefficient.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to a compiler with power and/or energy optimization, a complementary runtime manager, and a wireless mobile device having the compiler and/or the runtime manager.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

Figure 1:
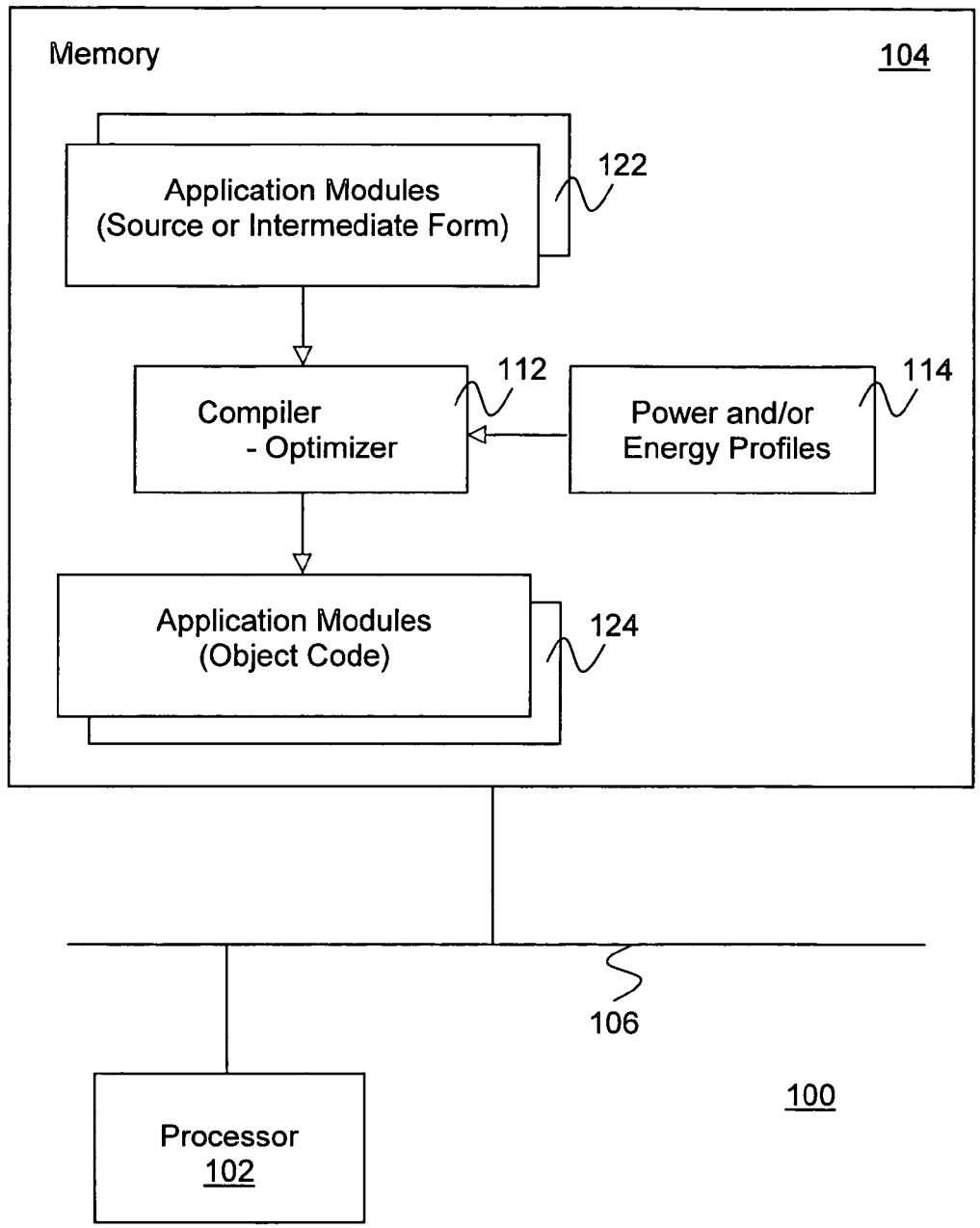
FIG. 1 illustrates a block diagram view of a computing environment, in accordance with an embodiment of the present invention.

Referring now to FIG. 1, wherein a block diagram view of an example computing environment, in accordance with one embodiment, is shown. As illustrated, example computing environment 100 includes processor 102 and memory 104 coupled to each other via bus 106 as shown. Memory 104 includes compiler 112, which includes an optimizer equipped to optimize the object code 124 generated for an application module 122 to improve at least the power level requirement or the energy requirement for executing the object code 124 in a target execution environment. The target execution environment may be computing environment 100 itself or another computing environment.

In various embodiments, application modules 122 may be provided to compiler 112 in a source form, e.g., Java, C#, or other languages of the like. In other embodiments, application modules 122 may be provided to compiler 112 in an intermediate form, e.g., a byte code form. In yet other embodiments, application modules 122 may be provided to compiler 112 in either form. Whether in source form or intermediate form, instructions of application modules 122 are "high level" instructions. In other words, they are non-native instructions of the target execution environment. The compilation generates object codes 124 comprised of native instructions of the target execution environment. The term "native instructions" as used herein refers to instructions of the instruction set supported by the processor of the target execution environment.

As described earlier, the compilation includes optimization for the power level requirement and/or energy requirement for executing generated object codes 124 in the target execution environment. For the purpose of this application, the term "power level requirement" refers to the highest power level required to execute a sequence of native instructions, which is typically the highest power level required by certain hardware circuitry to execute one or more of the native instructions of the code sequence. The power level required to execute a sequence of instructions affects the thermal dissipation of the target execution environment, as well as the life of the battery power source of the target execution environment (if it is powered by a battery power source). The term "energy requirement" refers to the amount of energy consumed to execute the sequence of native instructions in the target execution environment. Similarly, the energy required to execute a sequence of instructions also affects the life of the battery power source of the target execution environment (if it is powered by a battery power source).

In various embodiments, compiler 112 optimizes generated object code 124 to improve at least the power level required to execute the generated object code 124. In other embodiments, compiler 112 optimizes generated object code 124 to improve at least the energy required to execute the generated object code 124. In yet other embodiments, compiler 112 optimizes generated object code 124 to improve at least the power level required as well as the energy required to execute the generated object code 124.

In various embodiments, compiler 112 optimizes object code 124 in accordance with power and/or energy profiles 114. More specifically, in various embodiments, power and/or energy profiles 114 comprise power and/or energy profiles of the native instructions of the target execution environment. For example, in one embodiment, if the native instructions of the target execution environment includes an ADD instruction, a SUBTRACT instruction, a MUTIPLY instruction, and so forth, power and/or energy profiles 114 include the power level required and/or the energy required to execute the ADD instruction, the SUBTRACT instruction, the MUTIPLY instruction, and so forth, respectively. Profiles 114 for a target execution environment may be empirically determined, and then provided to computing environment 100.

Except for the teachings of the present invention, compiler 112 may be any one of a number of compilers known in the art or to be designed, including but are not limited to Java compiler, C# compiler, or a just-in-time (JIT) compiler. Application modules 122 may implement applications of any kind. Similarly, processor 102, memory 104, and bus 106 perform their conventional functions, and may be any one of a wide range of these elements known in the art or to be designed. The present invention may also be practiced in other computing environments with more or less hardware elements.

Figure 2:
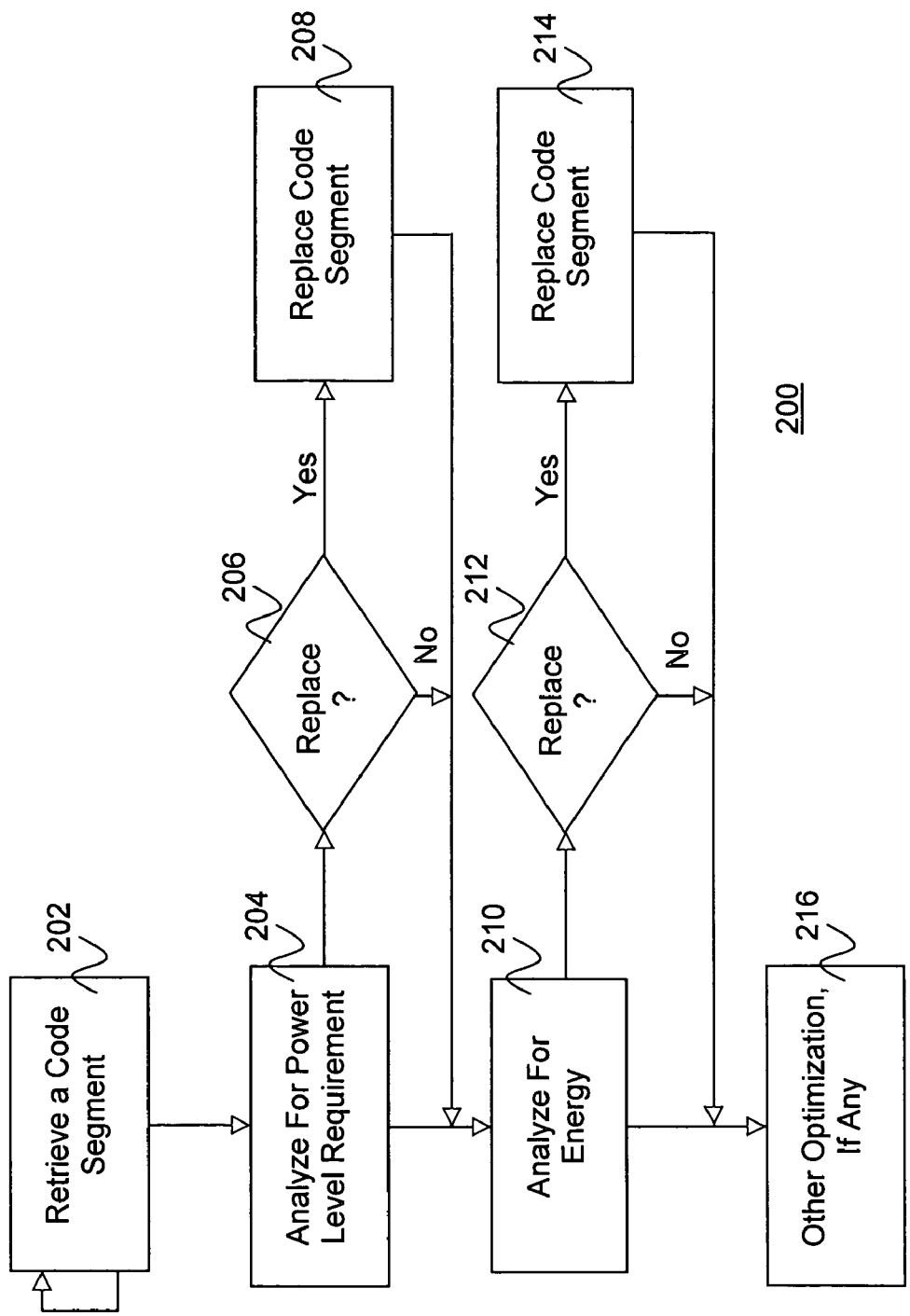
FIG. 2 illustrates a flow chart view of portions of the operational flow of the compiler of FIG. 1 in accordance with one embodiment.

FIG. 2 illustrates a flow chart view of portions of the optimization operational flow of compiler 112. As illustrated, upon given execution control, the optimizer portion of compiler 112 retrieves a sequence of instructions (also referred to as a code segment) for analysis, block 202. The manner in which compiler 112 selects a code segment for analysis is language and application dependent. That is, for a language that supports certain language syntax for programming loops, on encounter of the start of a loop, compiler 112 may look for the end of the loop, and analyze the loop as a code segment. For a language that supports ADD and ACCUMULATE, on encounter of an ADD instruction, compiler 112 may look ahead for a predetermined number of instructions, and analyze them as a code segment to determine if some of the instructions can be combined and replaced with other instructions that improve on one or more performance factors (e.g., size, execution speed, and so forth), and yet provide the same functional result(s).

Still referring to FIG. 2, on retrieval of a code segment, for the embodiment, the optimizer of compiler 112 analyzes the code segment for execution power level requirement, block 204. As described earlier, in various embodiments, the analysis is performed in view of power profile 114. In the course of analysis, the optimizer of compiler 112 determines if an alternative code segment with lower execution power level requirement is available, block 206. If the determination is affirmative, the optimizer of compiler 112 replaces the code segment with the alternative code segment with lower execution power level requirement, block 208.

On determination that no replacement code segment is available, block 206, or on replacement, block 208, for the embodiment, the optimizer of compiler 112 proceeds to analyze the code segment of execution energy requirement, block 210. As described earlier, in various embodiments, the analysis is performed in view of energy profile 114. In the course of analysis, the optimizer of compiler 112 determines if an alternative code segment with lower execution energy requirement is available, block 212. If the determination is affirmative, the optimizer of compiler 112 replaces the code segment with the alternative code segment with lower execution energy requirement, block 214.

On determination that no replacement code segment is available, block 212, or on replacement, block 214, the optimizer of compiler 112 proceeds to analyze the code segment for other optimization opportunities, block 216.

While for ease of understanding, the sequence of optimizations has been orderly described with power level optimization first, followed by energy optimization, and other conventional optimizations, in alternate embodiments, other optimization orders may be practiced. For examples, energy optimization and/or other conventional optimization may be performed before power level optimization.

Figure 3:
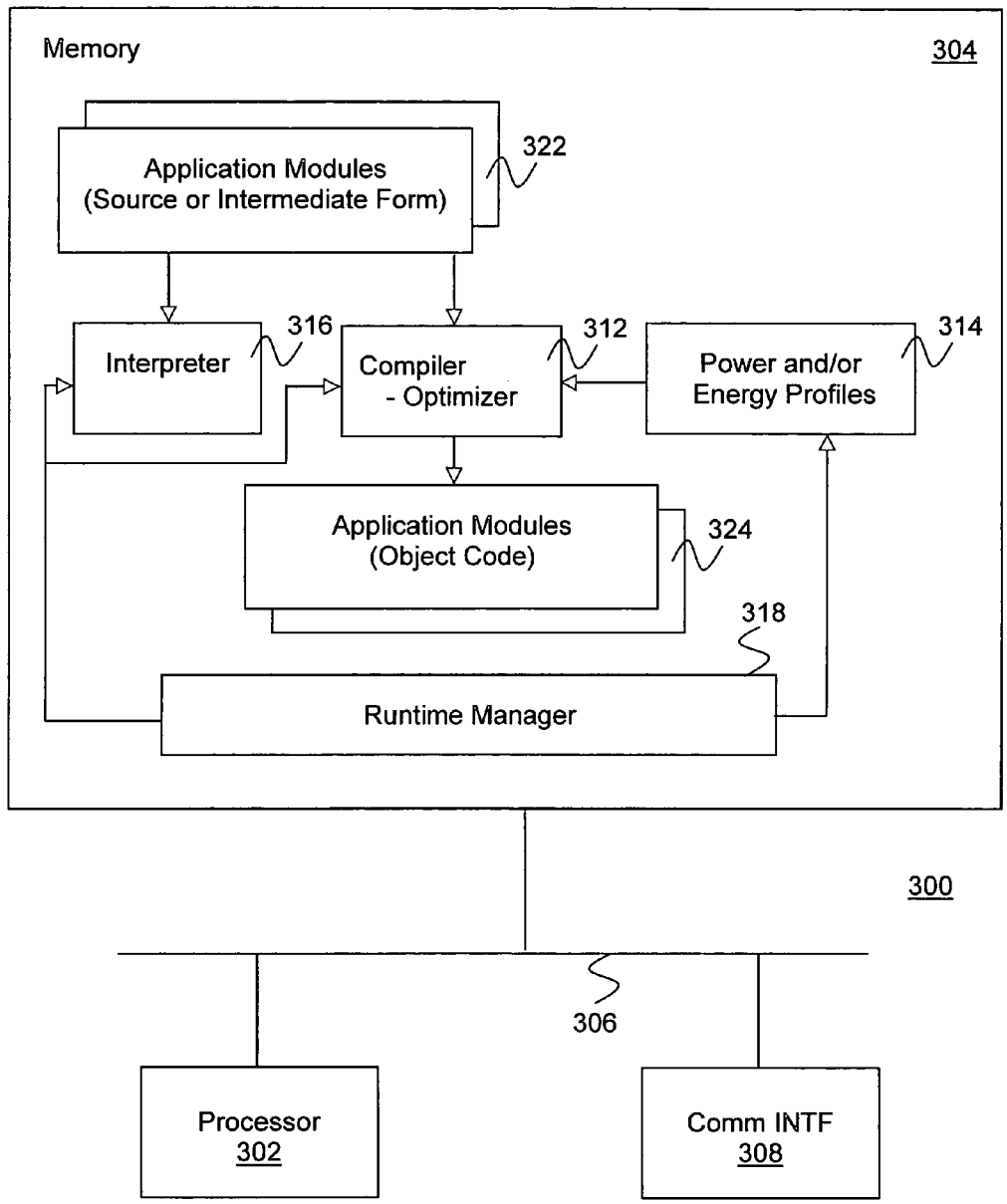
FIG. 3 illustrates a block diagram view of another computing environment, in accordance with another embodiment of the present invention.

FIG. 3 illustrates a block diagram view of another example computing environment, in accordance with another embodiment of the present invention. As illustrated, similar to computing environment 100, computing environment 300 includes processor 302, memory 304 coupled to each other via bus 306. Further, computing environment 300 also includes communication interface 308 coupled to the earlier described elements as shown. Memory 304, in addition to compiler 312, power and/or energy profiles 314, application module 322 and object codes 324 (which are corresponding to compiler 112, power and/or energy profiles 114, application module 122, and object codes 124), also includes interpreter 316 and runtime manager 318, coupled to earlier described elements as shown.

Interpreter 316 is employed to interpretively execute application modules 322. In various embodiments, interpreter 316 is equipped to interpretively execute application modules 322 in an intermediate form. In other embodiments, interpreter 316 is equipped to interpretively execute application modules 322 in source form. In yet other embodiments, interpreter 316 is equipped to interpretively execute application modules 322 in either source or an intermediate form.

In any event, to further optimize power usage and energy consumption in computing environment 300, runtime manager 318 is used to immediately invoke interpreter 316 to interpretively execute a received application module 322 for at least an initial number of times, before invoking compiler 312 to compile application modules 322, including optimizing generated code 324 to improve execution power level requirement and/or execution energy requirement in computing environment 300.

The practice provides the advantage of increasing the likelihood in achieving a net saving in power level and/or energy, notwithstanding the power level and/or energy investments required to perform the compilation.

In various embodiments, computing environment 100 may further include sensors for sensing power level and/or energy consumption, and system services for reporting the sensing data collected. For these embodiments, runtime manager 318 may be further equipped to conditionally monitor the execution of object code 324 for the power level and/or energy requirements of the various native instructions, and update profiles 314 with the observed power level and/or energy requirement. The conditional monitoring and updating may be performed based at least in part on whether a hardware/software switch is set or not. Provision of the hardware/software switch, and its setting may be provided and facilitated in any one of a number of known or to be designed manners.

In various embodiments, the initial number of times a received application module is to be executed before compilation is statically configured for runtime manager 318. In other embodiments, runtime manager 318 may be further equipped to dynamically determine the initial number of times a received application is to be executed before compiling the application. Runtime manager 318 may be equipped to make the determination based at least in part on the power level required and/or energy required to perform an "average" compile. Typically (though not necessarily), the higher power level or the more energy required to perform an "average" compile, the more times a received application module will be interpretively executed before being compiled. Runtime manager 318 may also make the decision further based on the size of the received application module 322. Similarly (though not necessarily), the larger the received application module (implying more energy is required to perform a compile), the more times a received application module will be interpretively executed before being compiled.

In some of these embodiments, runtime manager 318 may be further equipped to conditionally monitor the compilation of application modules 322 for the power level and/or energy required to perform an "average" compile, and update the number of initial executions to be performed before compilation accordingly, based at least in part on the results of the monitoring. Similarly, the conditional monitoring and updating may be performed based at least in part on whether a hardware/software switch is set or not. Again, provision of the hardware/software switch, and its setting may be provided and facilitated in any one of a number of known or to be designed manners.

In various embodiments, communication interface 308 is a wireless communication interface, and computing environment 300 is a wireless mobile device, such as a wireless mobile phone or a wireless personal digital assistant.

Figure 4:
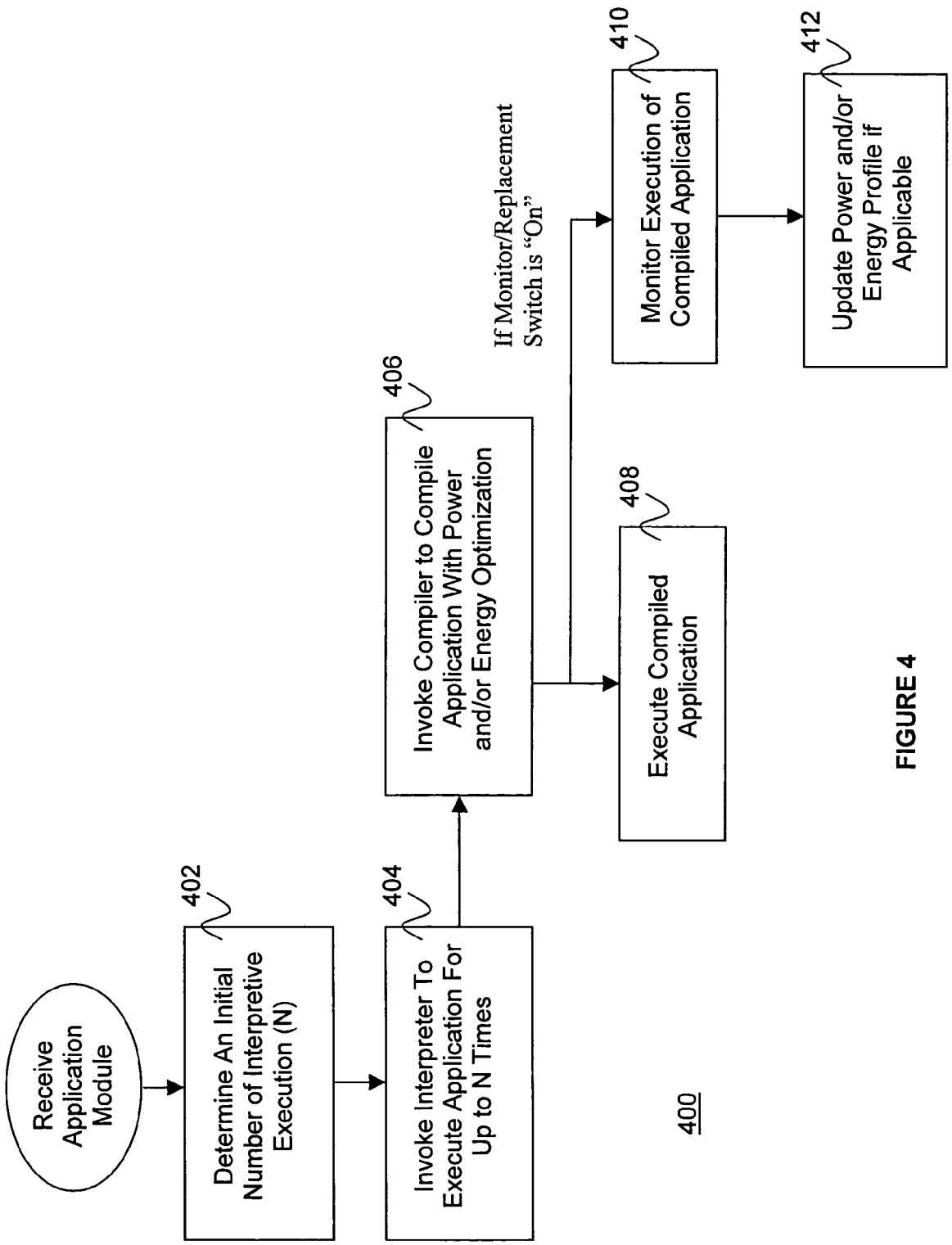
FIG. 4 illustrates a flow chart view of portions of the operational flow of the runtime manager of FIG. 3 in accordance with one embodiment.

FIG. 4 illustrates a flow chart view of portions of the operational flow of runtime manager 318, in accordance with one embodiment. The embodiment assumes the computing environment is equipped with the proper sensor hardware and sensed data reporting services. As illustrated, for the embodiment, on receipt of an application module 322, runtime manager 318 first determines a number of times (N) interpreter 316 should be used to interpretively execute the received application module 322 before compilation, block 402. On determination (and assuming N is non-zero), runtime manger 318 invokes interpreter 316 to interpretively execute the received application module 322 for up to N times, block 404.

During this period, runtime manager 318 monitors the execution. If indeed the received application module 322 has been executed up to N times, runtime manager 318 invokes compiler 312 to compile the received application module 322 into object code 324, including optimizing object code 324 to improve at least execution power level requirement or execution energy requirement, block 406. In various embodiments, as described earlier, on invocation of compiler 312, runtime manager 318 may monitor the compilation for the power level and/or energy required to perform an "average" compile, and update the profile accordingly, if a hardware/software switch is set.

Thereafter, runtime manager 318 allows object code 324 to be executed for as long as it is needed, block 408. For the embodiment, at the same time, runtime manager 318 conditionally monitors the execution of the object code 318 for at least part of the time, and updates the profiles accordingly, blocks 410-412, if a hardware/software switch is set.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A method comprising:
    receiving a plurality of non-native instructions in a selected one of a source form and an intermediate form;
    determining an initial number of times to interpretively execute the plurality of non-native instructions;
    interpretively executing the plurality of non-native instructions the initial number of times;
    monitoring execution of the plurality of non-native instructions to determine when the plurality of non-native instructions have been interpretively executed the initial number of times;
    compiling the plurality of non-native instructions to generate object code for the non-native instructions only after interpretively executing the plurality of non-native instructions the initial number of times, wherein compiling the plurality of non-native instructions includes replacing an object code segment from the generated object code with an alternative object code segment if the alternative object code segment improves at least a selected one of an execution power level required and an execution energy level required to execute the generated object code in a target execution environment.

2. The method of claim 1, wherein said receiving comprises receiving the non-native instructions in a byte code form.

3. The method of claim 1, wherein said compiling comprises analyzing the object code segment for execution power level requirement, and determining whether an alternative object code segment with lower execution power level requirement is available.

4. The method of claim 1, wherein said compiling comprises analyzing the object code segment for execution energy consumption, and determining whether an alternative object code segment with lower execution energy consumption is available.

5. The method of claim 1, wherein the method further comprises
    monitoring said compiling for power level required to perform compilation;
    updating a current understanding of power level required for compilation; and
    updating the initial number of times the plurality of non-native instructions are to be interpretively executed before compiling the received non-native instructions, if said monitoring observes a power level required for compilation to be different from the current understanding.

6. The method of claim 1, wherein the method further comprises
    monitoring said compiling for amount of energy required to perform an average compilation;
    updating a current understanding of amount of energy required for an average compilation; and
    updating the initial number of times the plurality of non-native instructions are to be interpretively executed before compiling the received non-native instructions, if said monitoring observes an amount of energy required for compilation to be different from the current understanding.

7. The method of claim 1, wherein the generated object code comprises a plurality of native instructions, and the method further comprises monitoring execution of the generated object code for power level required to execute the native instructions; and updating power level requirements of selected ones of the native instructions if said monitoring observes power level requirements for the selected ones of the native instructions to be different from current understandings of the power level requirements of the selected ones of the native instructions.

8. The method of claim 1, wherein the generated object code comprises a plurality of native instructions, and the method further comprises monitoring execution of the generated object code for amount of energy required to execute the native instructions; and updating energy requirements of selected ones of the native instructions if said monitoring observes energy requirements for the selected ones of the native instructions to be different from current understandings of the energy requirements of the selected ones of the native instructions.

9. In an electronic device, a method of operation, comprising:

receiving a plurality of non-native instructions;

determining an initial number of times to interpretively execute the non-native instructions based at least in part on one or more of an expected power level required to perform a compile or an expected energy required to perform the compile;

executing the non-native instructions for the initial number of times using an interpreter;

monitoring execution of the non-native instructions to determine when the non-native instructions have been executed the initial number of times using the interpreter; and compiling the non-native instructions into object code only after executing the received non-native instructions for said initial number of times using the interpreter.

10. The method of claim 9, wherein the method further comprises monitoring said compiling for a compilation requirement employed in determining the initial number of times the received non-native instructions are to be executed using the interpreter before compiling; and updating a current understanding of the compilation requirement if said monitoring observes the compilation requirement to be different from the current understanding.

11. The method of claim 9, wherein the generated object code comprises a plurality of native instructions, and the method further comprises monitoring execution of the generated object code for execution requirements of the native instructions; and updating execution requirements of selected ones of the native instructions if said monitoring observes execution requirements for the selected ones of the native instructions to be different from current understandings of the execution requirements of the selected ones of the native instructions.

12. The method of claim 9, wherein determining the initial number of times to interpretively execute the non-native instructions is based at least in part on a size of the non-native instructions.

13. An article of manufacture comprising:

a computer readable medium; and a plurality of instructions designed to implement a compiler to:

determine an initial number of times to interpretively execute a plurality of non-native instructions;

interpretively execute the plurality of non-native instructions the initial number of times;

monitor execution of the non-native instructions to determine when the non-native instructions have been interpretively executed the initial number of times;

compile the non-native instructions to generate object code for the non-native instructions only after interpretively executing the plurality of non-native instructions the initial number of times, and replace a segment of the generated object code with an alternative object code segment if the alternative object code segment improves at least a selected one of an execution power level required and an execution energy required to execute the generated object code in a target execution environment.

14. The article of claim 13, wherein said compiler analyzes the object code segment for execution power level requirement, and determines whether the alternative object code segment with lower execution power level requirement is available.

15. The article of claim 13, wherein said compiler analyzes the object code segment for execution energy consumption, and determines whether the alternative object code segment with lower execution energy consumption is available.

16. An article of manufacture comprising:

a computer readable medium; and a plurality of instructions designed to implement a runtime manager equipped to:

receive a plurality of non-native instructions, determine an initial number of times to interpretively execute the non-native instructions, the initial number of times based at least in pat on one or more of an expected power level required to perform an average compile or an expected energy required to perform the average compile, execute the non-native instructions for said initial number of times using an interpreter, monitor execution of the non-native instructions to determine when the non-native instructions have been interpretively executed the initial number of times, and invoke a compiler to compile the non-native instructions into object code only after executing the received non-native instructions for said initial number of times using the interpreter.

17. The article of claim 16, wherein the runtime manager is further equipped to monitor said compiling for a compilation requirement employed in determining the initial number of times received non-native instructions are to be executed before compiling; and update a current understanding of the compilation requirement if said monitoring observes the compilation requirement to be different from the current understanding.

18. The article of claim 16, wherein the generated object code comprises a plurality of native instructions, and the runtime manager is further equipped to monitor execution of the generated object code for execution requirements of the native instructions; and update execution requirements of selected ones of the native instructions if said monitoring observes execution requirements for the selected ones of the native instructions to be different from current understandings of the execution requirements of the selected ones of the native instructions.

19. The article of claim 16, wherein the runtime manager is further equipped to determine the initial number of times to interpretively execute the non-native instructions based at least in part on a size of the non-native instructions.

20. A system, comprising:
a storage medium having stored therein a plurality of instructions implementing a compiler to:
receive a plurality of non-native instructions in a selected one of a source form and an intermediate form,
determine an initial number of times to interpretively execute the plurality of non-native instructions;
interpretively execute the plurality of non-native instructions the initial number of times,
monitor execution of the non-native instructions to determine when the non-native instructions have been interpretively executed the initial number of times,
compile the non-native instructions to generate object code for the non-native instructions only after interpretively executing the plurality of non-native instructions the initial number of times, and
replace a segment of the generated object code with an alternative object code segment if the alternative object code segment improves at least a selected one of an execution power level required and an execution energy required to execute the generated object code in a target execution environment; and
a processor coupled to the storage medium to execute the instructions implementing the compiler.

21. The system of claim 20, wherein said compiler analyzes the object code segment for execution power level requirement, and determines whether an alternative object code segment with lower execution power level requirement is available.

22. The system of claim 20, wherein said compiler analyzes the object code segment for execution energy consumption, and determines whether an alternative object code segment with lower execution energy consumption is available.

23. The system of claim 20, wherein the apparatus further comprises a wireless communication interface to receive the non-native instructions.

24. A system, comprising:
a communication interface to receive a plurality of non-native instructions;
a storage medium coupled to the communication interface, and having stored therein a plurality of instructions designed to implement a runtime manager equipped to:
determine an initial number of times to interpretively execute the non-native instructions, the initial number of times based at least in part on one or more of an expected power level required to perform an average compile or an expected energy required to perform the average compile,
execute the received non-native instructions for the initial number of times using an interpreter,
monitor execution of the non-native instructions to determine when the non-native instructions have been interpretively executed the initial number of times, and
invoke a compiler to compile the non-native instructions into object code only after executing the received non-native instructions for said initial number of times using the interpreter; and
a processor coupled to the storage medium to execute the instructions implementing the runtime manager.

25. The system of claim 24, wherein the runtime manager is further equipped to monitor said compiling for a compilation requirement employed in determining the initial number of times received non-native instructions are to be executed using the interpreter before compiling; and
update a current understanding of the compilation requirement if said monitoring observes the compilation requirement to be different from the current understanding.

26. The system of claim 24, wherein the generated object code comprises a plurality of native instructions, and the runtime manager is further equipped to
monitor execution of the generated object code for execution requirements of the native instructions; and
update execution requirements of selected ones of the native instructions if said monitoring observes execution requirements for the selected ones of the native instructions to be different from current understandings of the execution requirements of the selected ones of the native instructions.

27. The system of claim 24, wherein the communication interface is a wireless communication interface.

28. The system of claim 24, wherein the runtime manager is further equipped to determine the initial number of times to interpretively execute the non-native instructions based at least in part on a size of the non-native instructions.

* * * * *